United States Patent
Favre-Bulle

(10) Patent No.: US 7,145,329 B2
(45) Date of Patent: Dec. 5, 2006

(54) MANUALLY OPERATED WORKING TOOL

(75) Inventor: Bernard Favre-Bulle, Feldkirch-Tosters (AT)

(73) Assignee: Hilti Aktiengesellschaft, Schaan (LI)

( * ) Notice: Subject to any disclaimer, the term of this patent is extended or adjusted under 35 U.S.C. 154(b) by 150 days.

(21) Appl. No.: 10/802,609

(22) Filed: Mar. 17, 2004

(65) Prior Publication Data

US 2004/0238587 A1    Dec. 2, 2004

(30) Foreign Application Priority Data

Mar. 22, 2003   (DE) ................... 103 13 766

(51) Int. Cl.
*G01N 27/82* (2006.01)
(52) U.S. Cl. .................. 324/240; 324/225; 324/239
(58) Field of Classification Search ............. 324/239, 324/230, 228, 229, 225, 240
See application file for complete search history.

(56) References Cited

U.S. PATENT DOCUMENTS

| 4,379,261 | A | * | 4/1983 | Lakin ...................... 324/240 |
| 4,483,474 | A | * | 11/1984 | Nikolich ...................... 227/8 |
| 5,453,689 | A | * | 9/1995 | Goldfine et al. ............. 324/239 |
| 5,500,783 | A | * | 3/1996 | Warda et al. ................ 361/179 |
| 5,548,214 | A | * | 8/1996 | Yasohama et al. .......... 324/240 |
| 6,377,039 | B1 | * | 4/2002 | Goldfine et al. ............. 324/232 |
| 6,420,867 | B1 | * | 7/2002 | Goldfine et al. ............. 324/242 |
| 6,433,542 | B1 | * | 8/2002 | Goldfine et al. ............. 324/239 |
| 6,471,106 | B1 | * | 10/2002 | Reining ........................ 227/8 |
| 6,501,414 | B1 | * | 12/2002 | Arndt et al. .................. 342/22 |
| 6,600,441 | B1 | * | 7/2003 | Liedtke et al. ............... 342/22 |
| 6,628,118 | B1 | * | 9/2003 | Amini ........................ 324/334 |
| 6,777,930 | B1 | * | 8/2004 | Fischer ...................... 324/230 |
| 6,843,401 | B1 | * | 1/2005 | Favre-Bulle .................. 227/10 |
| 2001/0038287 | A1 | * | 11/2001 | Amini ........................ 324/341 |
| 2003/0038628 | A1 | * | 2/2003 | Nath et al. .................. 324/230 |

FOREIGN PATENT DOCUMENTS

| DE | 4200518 | * | 7/1993 |
| DE | 4405648 | * | 8/1995 |
| DE | 19847688 | * | 5/2000 |
| EP | 0366221 | * | 5/1990 |

* cited by examiner

Primary Examiner—Jay M. Patidar
(74) Attorney, Agent, or Firm—Abelman, Frayne & Schwab

(57) ABSTRACT

The present invention relates to a manually operated working tool such as an internal combustion operated setting tool for driving in fastening elements such as nails, bolts, pins into a magnetizable substrate, having an inductive metal detector assembly (20) with at least one excitation coil arrangement (21) and evaluation means. A means for generating an alternating current for the excitation coil arrangement (21) having at least two consecutive frequencies $f_n$ from a start frequency $f_0$ to an end frequency $f_{max}$ is provided on the inductive metal detector assembly (20).

9 Claims, 3 Drawing Sheets

MANUALLY OPERATED WORKING TOOL

BACKGROUND OF THE INVENTION

The present invention relates to a manually operated working tool having an inductive metal detector assembly having at least one excitation coil arrangement and evaluation means, wherein the inductive metal detector system has a means for generating an alternating current for the excitation coil arrangement having at least two consecutive frequencies $f_n$ from a starting frequency $f_0$ to an end frequency $f_{max}$. This type of working tool can, for example, be configured as a bolt setting tool.

In the case of manually operated working tools in steel to steel fastening applications such as, for example, in the fastening of sheet steel to steel panels.

EP 0 366 221 A2 discloses a manually operated working tool, especially a drilling machine, on which a metal detector is arranged for detecting metal parts located in the substrate. A coil arrangement is arranged in the metal detector, with which a spatially rotating alternating current field is generated by rotation of the coil arrangement or by alternating current supply to the coil arrangement. When this is done, the frequency of the alternating electrical current for operating the coil arrangement is held constant. The variation of the electrical energy pulled through the coil arrangement is measured.

A metal concealed in the substrate can be detected by virtue of this type of coil arrangement and, if required, its orientation in the substrate determined. If, however, the substrate is comprised of metal such as, for example, the fastening of sheet steel to steel beams, the situation of the beams can no longer be resolved because of the influence of the sheet steel.

U.S. Pat. No. 5,500,783 discloses a method and a circuit for automatically triggering the operation for setting a fastening element onto a substrate and a support. In the circuit, a comparator receives a first signal from a sensor and generates an intermediate signal, if a pre-defined condition between the first signal and a pre-defined value is fulfilled. A control device generates a control signal after receiving the intermediate signal of the sensor and the primary signal. A fastening element is driven by an actuator into the surface and the support as a consequence of the control signal. The structure of the sensor and signal processing is not described in U.S. Pat. No. 5,500,783.

DE 198 47 688 C2 discloses a method and the sensor based on said method for detecting foreign bodies in a medium, in particular concrete, tiling, plaster or wood using radar, by a pulse radar or a stepped frequency radar. This method provides a radar wave of very short duration that is radiated into the medium using a transmitting/receiving antenna for picking up the radar signal reflected in the medium and after pre-processing of a signal evaluation and assessment, which is based on an algorithm, and renders identifiable the differences in the signal form, for example of a performance range compared with stored comparison values of a sample spectrum with subsequent evaluation of the comparison by correlation for determining deviations vis-a-vis pre-definable critical or limit values of a correlation factor.

In this case, the drawback in steel to steel applications is that the radar waves generated are already reflected to a significant degree by the first metal layer and a metal element situated behind it is not recognized.

A very high power output of the radar detector is required to achieve passage through the front metal layer such as, for example, a metal sheet. In this case, realization of such a detector system in a manually operated working device without a mains connection is not possible. In addition, the microwave generator for the device is relatively expensive.

DE 44 05 648 A1 discloses, as is already well-known, arranging an inductive or capacitive sensor (not more precisely defined) at the front of a fluid-driven driving tool and coupling with a controller device.

SUMMARY OF THE INVENTION

The object of the present invention is to provide a manually operated working tool of the aforementioned type, such as an internal combustion driven setting tool and developing a method for operating an inductive metal detector system for said general type of device, which avoids the aforementioned drawbacks and with which fastening of steel panels to steel supports is possible in user-friendly fashion. This is achieved according to the invention by an inductive metal detector system having a means for generating an alternating current for the excitation coil arrangement with at least two consecutive frequencies $f_n$ from a starting frequency $f_0$ to an end frequency $f_{max}$. By virtue of this operation, magnetic fields of different frequencies can be generated by the excitation coil arrangement of the inductive metal detector assembly and different frequency secondary currents are generated at an evaluation or sensor coil arrangement, which have characteristic harmonic content for different magnetizable substrates or for substrates comprised of one or a plurality of magnetizable components. Using this "finger print" -like harmonic pattern, the inductive metal detector assembly can recognize, if a steel support is arranged beneath a metal panel to be fastened.

In an advantageous further embodiment of the invention, the means for generating the frequency sequence $f_1$, from $f_0$ to $f_{max}$, for example, is a stepped frequency generator. This can be configured as a digital sinusoidal oscillator and can advantageously be monitored and controlled by an evaluation and control unit. By virtue of the utilization of a stepped frequency generator, the inductive metal detector assembly can be economically manufactured and these can effect very rapid measurements in sequence.

To achieve a compact architecture and to achieve an advantageous symmetry of coil arrangement, the evaluation coil arrangement can be arranged coaxial with the excitation coil arrangement and arranged peripheral thereto.

It is advantageous, if the evaluation means, in particular the evaluation and control unit of the inductive metal detector assembly has a correlation means for compensation of a system-internal harmonic pattern. By virtue of this procedure, the harmonic pattern generated by the manually operated working tool itself, which represents a "basic finger print" of the system, can be extracted from the collected measurement values so that only the remaining patterns of the magnetizable substrate remain for continuing analysis.

Advantageously, the inductive metal detector assembly has a data processing unit for comparing the harmonic pattern measured and, corrected by the correlator means, with stored harmonic patterns of known magnetizable substrate. By virtue of the utilization of an electronic data processing unit such as a microprocessor, the inductive metal detector assembly can be economically manufactured and can very rapidly evaluate the measurements made.

In addition, it can be advantageous, if the inductive metal detector assembly is associated with a switching element, by which the manually operated working tool can be switched to an operation ready mode, if an inductive metal detector assembly detected a second magnetizable component under a first magnetizable component and for transporting the manually operated working tool into a non-operation ready mode, if the inductive metal detector assembly does not detect a second magnetizable component under a first magnetizable component. By virtue of this measure, the ease of operation of a manually operated working tool is increased, because incorrect use of the working tool is no longer possible.

The hereinbefore described working tool can be configured as an internal combustion driven setting tool, wherein a firing unit can be activated via the aforementioned switching means, if the inductive metal detector assembly detects a second magnetizable component under a first magnetizable component at a contact point and wherein the firing unit can be deactivated by the switching means, if no second magnetizable component is detected under a first magnetizable component at the contact point. By virtue of this measure, an internal combustion driven setting tool, which are configured to be very user friendly, in particular those used in siding and roofing applications.

A manually operated working tool configured as a setting tool can be advantageous, if the excitation coil arrangement and/or the assessment coil arrangement are arranged at a front zone of a bolt guide. The operator must press the setting tool with its forward zone of the bolt guide against the substrate for triggering a setting operation. By virtue of the arrangement of the excitation coil arrangement and/or the evaluation coil arrangement at this forward zone, it is therefore possible to apply the coil arrangements consistently on the magnetizable substrate. In this case, the coil arrangement can also be used as a temporary mounting means for the setting tool on the substrate, since it is attracted to the substrate because of the magnetic fields of the excitation coil arrangement, as long as the excitation arrangement is supplied with current.

An advantageous method for detecting a concealed second magnetizable components concealed behind a first magnetizable component using an inductive metal detector assembly on a manually operated working tool, whereby the inductive metal detector assembly can have at least one excitation coil arrangement has at least one evaluation coil arrangement and evaluation means, includes the following process steps:

a.) Initialization of the inductive metal detector assembly;
b.) Setting of the frequency $f_n$, within a frequency range of $f_0$ to $f_{max}$;
c.) of a magnetic field having the frequency $f_n$ at the excitation coil arrangement;
d.) Receiving a magnetic secondary field at the evaluation coil arrangement for generation of the secondary current;
e) Frequency spectral evaluation of the secondary current from the evaluation coil arrangement in the evaluation means;
f.) Intermediate storage of the detected harmonic frequencies and amplitudes in the evaluation means;
g) Repeat implementation of steps b.) to f.) as long as $f_{max}$ is not reached;
h.) Filtering out of all frequencies of harmonics that were generated by magnetization of the manually operated working tools and by the first magnetizable component and using data stored in the evaluation means;
i.) Comparison of the remaining frequency pattern of the harmonics with patterns stored in the assessment means of two magnetizable components; and
j.) Passing the manually operated working tool in an operation—ready mode, if a second magnetizable component is detected by the inductive metal detector assembly under the first magnetizable component.

The assessment of the data harvested can accordingly be done using a fast Fourier transformation (FFT). However, it is also conceivable to receive the various frequencies using a multi-channel receiving means and to then subject it to further evaluation.

By virtue of the method according to the invention it is assured that, in a magnetizable substrate, points having a plurality of magnetizable components situated in sequence that can be automatically differentiated from points with only one magnetizable component. If the method according to the invention is used in an internal combustion driven setting tool, then said tool can automatically identify contact points in the case of steel on steel applications in a fashion advantageous to the operator.

SUMMARY OF THE INVENTION

Other advantages and procedures of the invention will become apparent from the following description with reference to the drawings, wherein.

DETAILED DESCRIPTION OF THE INVENTION

Figure 1:
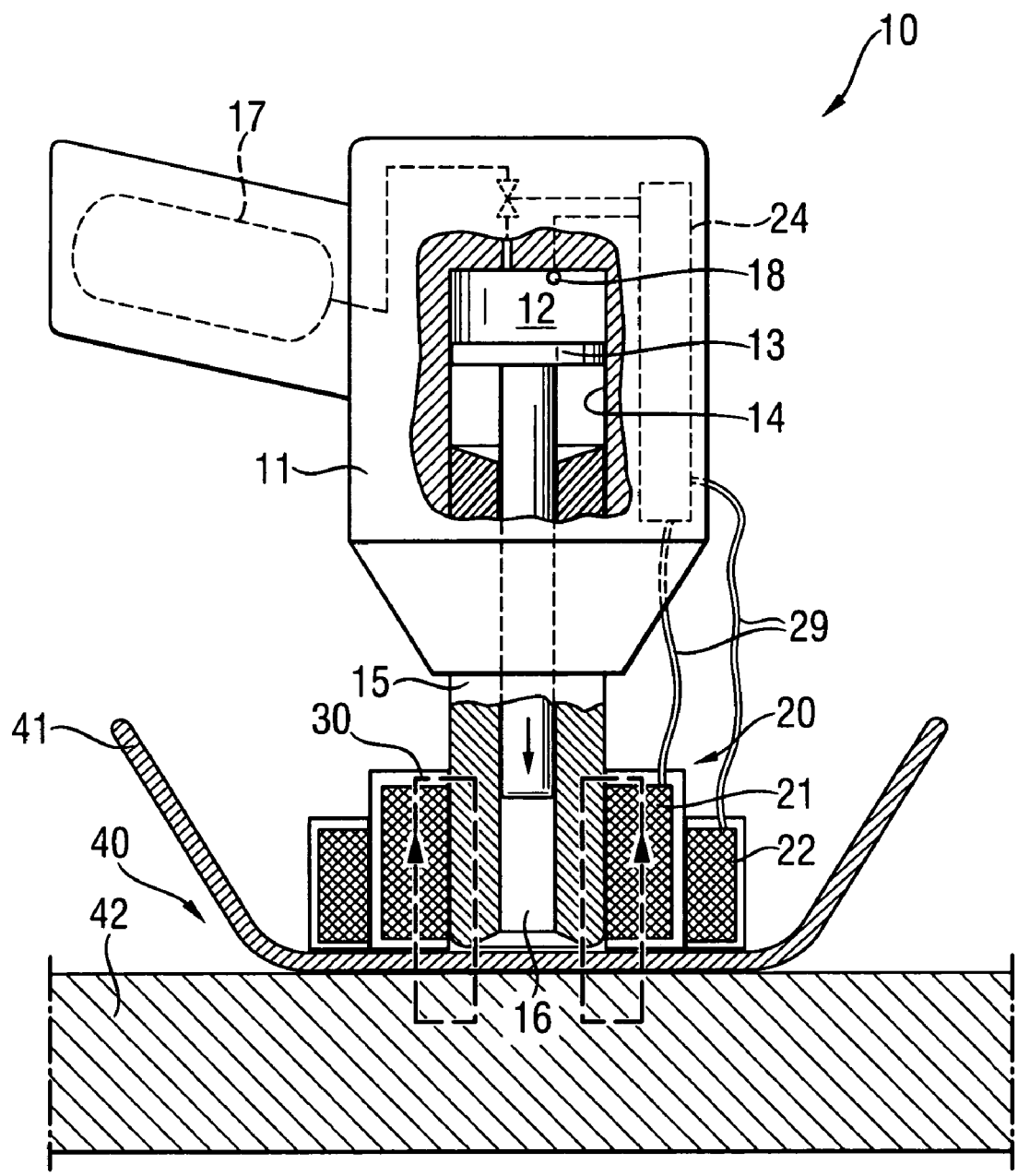
FIG. 1 shows a manually operated working tool according to the invention, in partial longitudinal section, and configured as an internal combustion driven setting tool.

In FIG. 1, a manually operated working tool according to the invention is represented as an internal combustion operated setting tool. The setting tool 10 is operated using a fuel gas, which is stored in a fuel reservoir on the setting tool. The setting tool 10 has a housing 11, in which a setting mechanism is arranged for driving a fastening element into a substrate. A combustion chamber or a combustion space 12, a piston guide 14, in which a driver piston 13 is housed and a bolt guide 15 for guiding a fastening element comprise the setting mechanism. A firing unit 18 is provided in the combustion chamber for igniting an air-fuel gas mixture introduced into the combustion chamber 12.

An inductive metal detector assembly (identified with 20) is arranged on the setting tool, which includes an excitation coil arrangement 21, an evaluation coil arrangement 22, and an evaluation and control unit 24. In this case, the excitation coil arrangement 21 and the evaluation coil arrangement 22 are arranged at the front zone 16 of the bolt guide 15, which they enclose in an annular fashion and are connected with the control unit by electrical lines 29.

Figure 2:
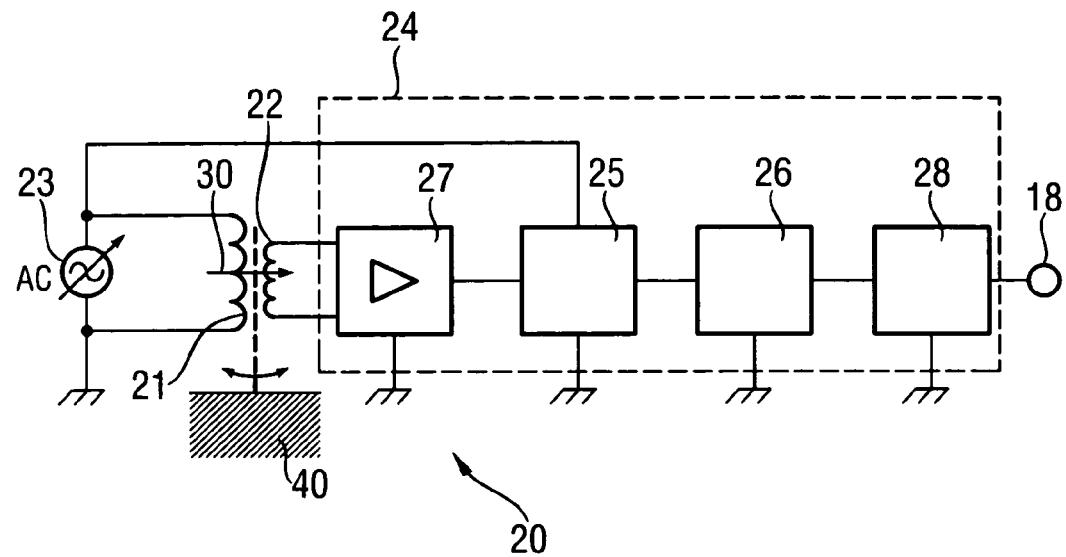
FIG. 2 shows switching arrangements of an inductive metal detector assembly according to the invention.

FIG. 2 represents the structure of the inductive metal detector assembly 20. The excitation coil arrangement 21 is addressed by a stepped frequency generator 23 such as a digital sinusoidal oscillator, which is controlled using the evaluation and control unit 24. A magnetic flux 30 generated by the excitation coil arrangement 21, via the dispersion fields, are generated in magnetic components 41, 42 of a substrate 40 to be processed and magnetizable components of the setting tool 10, such as the bolt guide 15 (FIG. 1). Low voltages are induced in the evaluation coil arrangement 22 by these scatter field parts, which are sent for further evaluation in the evaluation and control unit 24. The low voltages are taken up by an amplifier 27, which forwards the signals for further evaluation to a correlator means 25 and a data processing unit 26 such as a microprocessor with an A/D inverter. The evaluation is described below in more detail with continued reference to FIGS. 3 and 4.

In addition, the evaluation and control unit 24 has a switching means 28, by which the firing unit 18 can be placed in an active mode or in an inactive mode. In the inactive mode, firing of the setting tool 10 and thus triggering of a setting operation is not possible.

The setting tool 10 is applied to a substrate 40 so that the inductive metal detector assembly 20 is activated. An alternating current with periodical changing frequencies $f_n$ from $f_0$ to $f_{max}$ flows through the excitation coil arrangement 21, whereby $f_n$ represents the starting frequency to $f_0$ to $f_{max}$ where $f_{max}$ represents the end frequency in a temporal course. The current in the excitation coil arrangement 21 generates an alternative magnetic field, which induces a current in the evaluation coil arrangement 22 by induction and permeates the magnetizable components 41, 42 of the substrate 40 with the magnetic flux 30.

Figure 3:
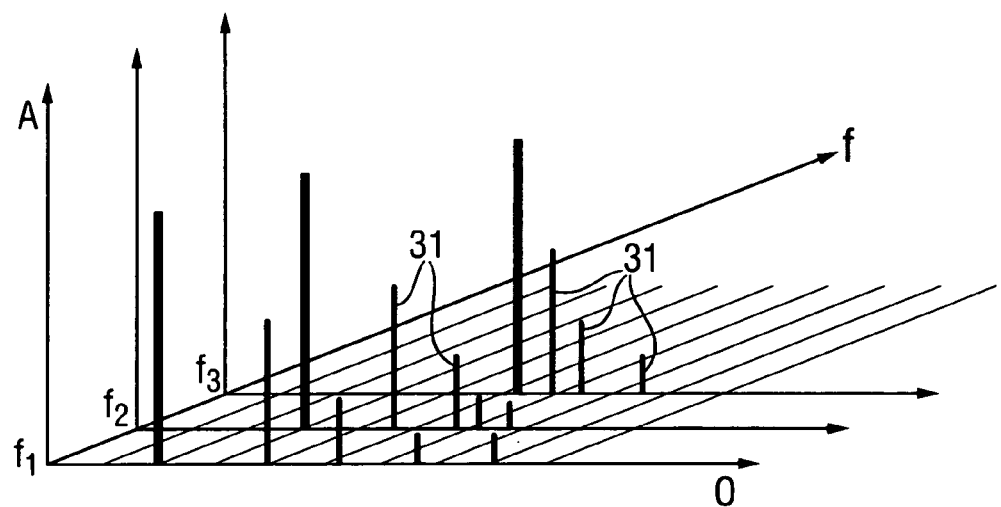
FIG. 3 shows a frequency spectrum of the evaluation coil signal of the inductive metal detector assembly of FIG. 1 and FIG. 2, excitation frequency (f), amplitude (A), frequency or harmonics (O)

Depending on the magnetic properties of the core, the harmonics are generated by the non-linearities of the magnetization characteristic, which are dependent on the magnetization field strengths—thus, on the current of the excitation coil arrangement 21—and the frequency $f_n$. In this case, the harmonic pattern represents a "finger print" on the presence of magnetizable material in the core and in the environment of the coil arrangements 21, 22 and is graphically illustrated in FIG. 3. FIG. 3 shows the respective excitation frequency $f_n=f_1$ to $f_3$ and the associated harmonics 31. With a frequency change from $f_1$ to $f_2$ changes also the amplitude distribution of the harmonics 31. This occurs primarily by virtue of the non-linearity of the magnetization characteristic and is further influenced at higher energy excitation frequencies $f_n$. In the absence of a magnetizable material external to the device (e.g., the first and second magnetizable components 41, 42) the harmonic pattern represents a "basic finger print" of the setting tool 10 with the inductive metal detector arrangement 20. This "basic finger print" is learnt by the evaluation and control unit 24 and stored therein. In an application of the setting tool 10 on a substrate 40, the harmonic pattern received can be compensated by the correlator means 25 around the "basic finger print", so that in the following only harmonic patterns will be taken into account and analyzed that arise on the basis of the presence of magnetizable material in the substrate 40. If in the harmonic pattern cleaned up in this fashion by the evaluation and control unit 24 a second magnetizable component 42 (for example, a steel support) is detected under a first magnetizable component 41 (for example, a steel panel), then the firing unit 18 is actively switched by the evaluation and control unit 24 via the switching means 28 such that a user can trigger a setting operation by a triggering switch of the setting tool 10.

Figure 4:
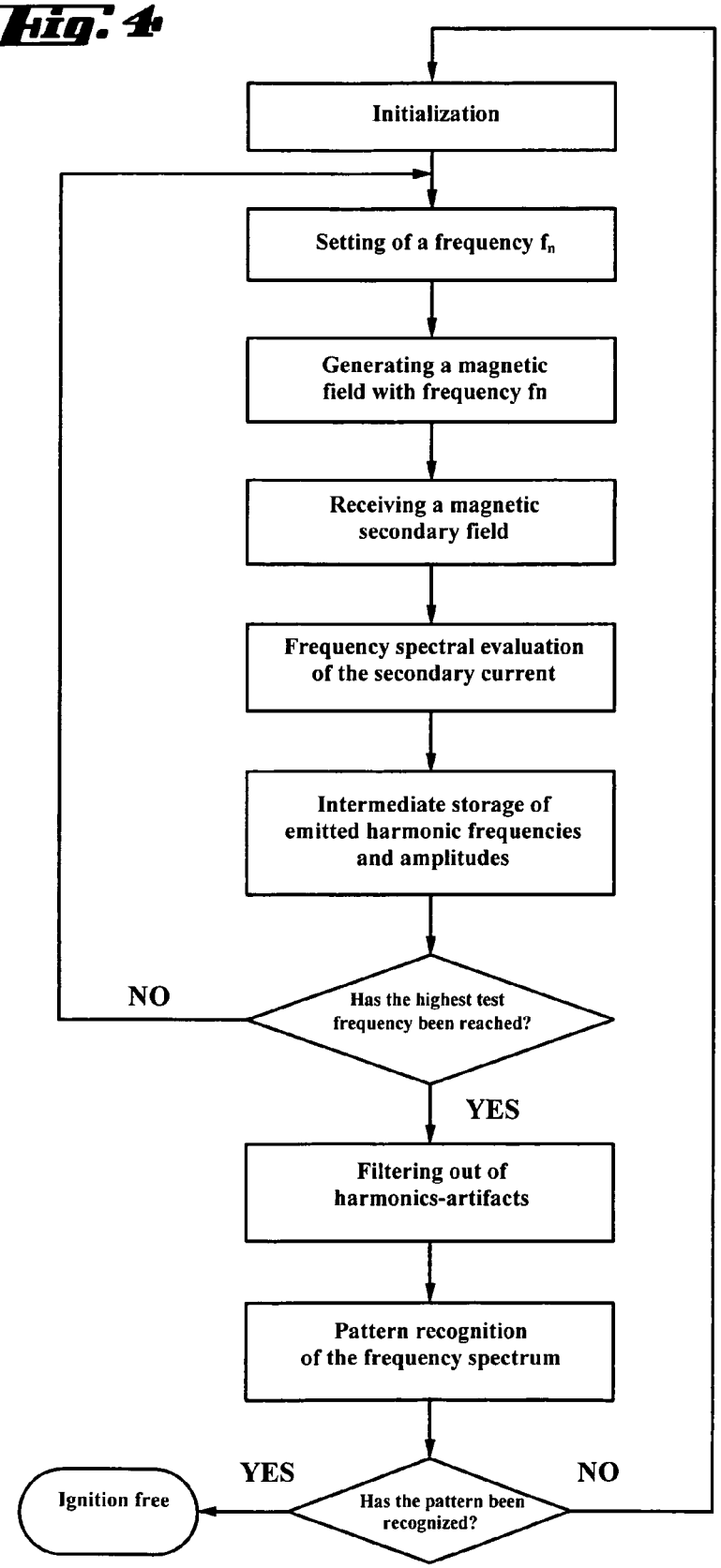
FIG. 4 shows a step diagram relating to a procedure according to the invention for identification of a magnetizable object under a magnetizable cover layer.

With reference to FIG. 4, a method according to the invention for detecting a second magnetizable component concealed behind a first magnetizable component using an inductive metal detector assembly on a manually operated working tool is described.

After the application of the setting tool on a substrate 40, initially an initialization of the inductive metal detector assembly is done.

A first frequency $f_n$ within a frequency range $f_0$ to $f_{max}$ is set for the stepped frequency generator 23 by the evaluation and control unit 24. This feeds an alternating current with frequency $f_1$ into the excitation coil arrangement 21 such that a magnetic field with frequency $f_n$ is generated at the excitation coil arrangement. At the evaluation arrangement 22 a magnetic secondary field is received, whereby a secondary current is generated in the evaluation coil arrangement 22. A frequency spectral evaluation of the secondary current from the evaluation coil arrangement 22 occurs in the evaluation means 24 by a fast Fourier transformation (FFT). The acquired data for the determined harmonic frequencies and amplitudes are intermediately stored in the evaluation means. The evaluation and storage unit 24 is then queried, whether the frequency of the stepped frequency generator 23 is already equal to $f_{max}$. If this is not the case, then a new measurement loom is carried out using a new, higher frequency $f_n$. This measurement loop are continued until $f_n$ is equal to $f_{max}$.

All frequencies are then filtered out of the harmonics, which are generated by magnetization of the setting tool 10 and by the first magnetized component 41, by the correlator means 25 using the data stored in the evaluation and control unit 24. The remaining frequency patterns of the harmonics (finger print of a possible second magnetized component 42) is then compared with the patterns of the second magnetized components stored in the evaluation means.

The setting tool 10 is then sent into an operation—ready mode, if the inductive metal detector assembly 20 detects a second magnetizable component 42 under the first magnetizable component 41 using the harmonic pattern. If no second magnetizable component 42 is detected, then the setting tool 10 is not passed into the operation 13 ready (active) mode.

In lieu of the proposed numeric evaluation of the current values by a FFT analysis, a filtering in the frequency range can be provided by a multi-channel receiver, which is connected downstream of the evaluation coil arrangement.

What is claimed is:

1. A manually operated working tool including an internal combustion operated setting tool for driving in fastening elements including one of nails, bolts, pins into a magnetizable substrate, having an inductive metal detector assembly (20) with at least one excitation coil arrangement (21) and evaluation means, wherein the inductive metal detector assembly (20) has a means for generating an alternating current for the excitation coil arrangement (21) having at least two consecutive frequencies ($f_n$) from a starting frequency ($f_0$) to an end frequency ($f_{max}$), wherein the inductive metal detector assembly (20) has an evaluation coil arrangement (22) that is arranged externally around the excitation coil arrangement, and wherein the evaluation means of the inductive metal detector assembly (20) has a correlator means (25) for compensation of a system-internal harmonic pattern.

2. The working tool of claim 1, wherein the means for generating the frequency sequence is a stepped frequency generator (23).

3. The working tool of claim 1, wherein the inductive metal detector assembly (20) has a data processing unit (26)

for comparing the measured harmonic pattern, corrected by the correlator means (25), with stored harmonics patterns of known substrates.

4. The working tool of claim 3, wherein the evaluation means of the inductive metal detector assembly (20) detects a second magnetizable component (42) and passes the manually operated working tool into a non-operating mode, if the inductive metal detector (20) does not detect a second magnetizable component (42) under a first magnetizable component (41).

5. The working tool of claim 4, wherein the manually operated working tool is an internal combustion operated setting tool (10), wherein a firing unit (18) can be deactivated using a switching means (28), if the inductive metal detector assembly (20) does not detect a second magnetizable component (42) under a first magnetizable component (41).

6. The working tool of claim 5, wherein the manually operated working tool is an internal combustion operated setting tool (10), wherein at least one of the excitation coil arrangement (21) and the evaluation coil arrangement (22) is arranged at a forward zone (16) of a bolt guide (15).

7. A method for detecting a second magnetizable component (42) concealed behind a first magnetizable component (41) using an inductive metal detector assembly (20) on a manually operated working tool, wherein the inductive metal detector assembly (20) has at least one excitation arrangement (21), at least one evaluation coil arrangement (22) and evaluation means, including the following processing steps:

(a.) Initializing the inductive metal detector assembly (20);

(b.) Setting the frequency ($f_n$) within a frequency range of ($f_0$) to ($f_{max}$);

(c.) Generating a magnetic field having the frequency ($f_n$) at the excitation coil arrangement (21);

(d.) Receiving a magnetic secondary field at the evaluation coil arrangement (22) for generating the secondary current;

(e.) Frequency spectral evaluation of the secondary current from the evaluation coil arrangement (22) in the evaluation means;

(f.) Intermediately storing the detected harmonic frequencies and amplitudes in the evaluation means;

(g.) Repeating steps (b.) to (f.) so long as ($f_{max}$) is not reached;

(h.) Filtering out all frequencies of harmonics that were generated by magnetization of the manually operated working tool and by the first magnetizable component (41) and using data stored in the evaluation means;

(i.) Comparing the remaining frequency pattern of the harmonics with patterns stored in the assessment of two magnetizable components;

(j.) Passing the manually operated working tool into an operation-ready mode, if a second magnetizable component (42) is detected by the inductive metal detector assembly (20) under the first magnetizable component (41).

8. The method of claim 7, wherein the manually operated working tool is configured as an internal combustion operated setting tool (10).

9. The process of claim 7, wherein the frequency spectral evaluation of the secondary current is performed in the evaluation means by a fast Fourier transformation (FFT).

* * * * *